(12) United States Patent
Cociglio et al.

(10) Patent No.: US 11,611,495 B2
(45) Date of Patent: Mar. 21, 2023

(54) ENABLING A PERFORMANCE MEASUREMENT IN A PACKET-SWITCHED COMMUNICATION NETWORK

(71) Applicant: TELECOM ITALIA S.p.A., Milan (IT)

(72) Inventors: Mauro Cociglio, Turin (IT); Giuseppe Fioccola, Naples (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 17/290,488

(22) PCT Filed: Nov. 5, 2019

(86) PCT No.: PCT/EP2019/080201
§ 371 (c)(1),
(2) Date: Apr. 30, 2021

(87) PCT Pub. No.: WO2020/194623
PCT Pub. Date: May 14, 2020

(65) Prior Publication Data
US 2021/0409296 A1    Dec. 30, 2021

(30) Foreign Application Priority Data
Nov. 7, 2018 (IT) .................. 102018000010131

(51) Int. Cl.
*H04L 43/065* (2022.01)
*H04L 43/026* (2022.01)
(Continued)

(52) U.S. Cl.
CPC .......... *H04L 43/065* (2013.01); *H04L 43/026* (2013.01); *H04L 43/067* (2013.01); *H04L 43/0894* (2013.01)

(58) Field of Classification Search
CPC ................ H04L 43/026; H04L 43/065; H04L 43/067; H04L 43/0894; H04L 12/26; H04L 7/08; H04L 43/08; H04L 43/06; H04J 3/0658
(Continued)

(56) References Cited

U.S. PATENT DOCUMENTS

| 2011/0019681 | A1 | 1/2011 | Gazier et al. |
| 2013/0223274 | A1* | 8/2013 | Cociglio ............. H04L 43/0888 370/253 |
| 2014/0043999 | A1* | 2/2014 | Bugenhagen ......... H04W 24/02 370/252 |

(Continued)

FOREIGN PATENT DOCUMENTS

| WO | WO 2010/072251 A1 | 7/2010 |
| WO | WO 2011/079857 A1 | 7/2011 |

(Continued)

OTHER PUBLICATIONS

International Search Report and Written Opinion dated Jan. 17, 2020 in PCT/EP2019/080201 filed Nov. 5, 2019.
Fioccola, G., et al., "Alternate-Marking Method for Passive and Hybrid Performance Monitoring; RFC8321.txt", Internet Engineering Task Force (IETF), XP015125343, 2018, 33 total pages.

(Continued)

*Primary Examiner* — Anh Nguyen
(74) *Attorney, Agent, or Firm* — Oblon, McClelland, Maier & Neustadt, L.L.P.

(57) ABSTRACT

A method for enabling a performance measurement on packet flow transmitted through a communication network. A marking value is periodically switched in the packets with a marking period Tm. The packet flow is then divided into blocks of duration Ts (synchronization period). Each synchronization period comprises an integer number of marking periods. Two or more measurement points on the path of the packet flow may provide a performance parameter for each marking period and associate thereto a synchronization (Continued)

information generated based on their local clocks and relating to the synchronization period containing the marking period to which the performance parameter relates; and a sequence information indicating the marking period's position within the synchronization period. A management server may identify performance parameters provided by different measurement points and relating to a same marking period based on the synchronization information and the sequence information.

18 Claims, 4 Drawing Sheets

(51) Int. Cl.
*H04L 43/067* (2022.01)
*H04L 43/0894* (2022.01)

(58) Field of Classification Search
USPC .......................................................... 709/224
See application file for complete search history.

(56) References Cited

U.S. PATENT DOCUMENTS

| | | | | |
|---|---|---|---|---|
| 2015/0281025 | A1* | 10/2015 | Wallbaum | H04L 43/062 370/252 |
| 2016/0105353 | A1* | 4/2016 | Cociglio | H04L 43/0829 370/252 |
| 2016/0337223 | A1* | 11/2016 | Mackay | H04L 43/16 |
| 2017/0244623 | A1* | 8/2017 | Cociglio | H04L 43/106 |

FOREIGN PATENT DOCUMENTS

| | | |
|---|---|---|
| WO | WO 2013/174417 A1 | 11/2013 |
| WO | WO 2015/090364 A1 | 6/2015 |

OTHER PUBLICATIONS

Trammell, B., et al., "The QUIC Latency Spin Bit; draft-ietf-quic-spin-exp-01.txt", QUIC, XP015129603, 2018, 8 total pages.
Trammell, B., et al., "The Addition of a Spin Bit to the QUIC Transport Protocol draft-trammell-quic-spin-01", QUIC, 2017, 22 total pages.

* cited by examiner

ENABLING A PERFORMANCE MEASUREMENT IN A PACKET-SWITCHED COMMUNICATION NETWORK

TECHNICAL FIELD

The present invention relates to the field of communication networks. In particular, the present invention relates to a method for enabling a performance measurement in a packet-switched communication network, and to a packet-switched network configured to implement such method.

BACKGROUND ART

In a packet-switched communication network, packet flows are transmitted from source nodes to destination nodes through possible intermediate nodes. Exemplary packet-switched networks are IP (Internet Protocol) networks, Ethernet networks and MPLS (Multi-Protocol Label Switching) networks.

Packets not always reach their destination nodes, i.e. they may be lost during transmission through the network. Packet loss is due to different reasons. For instance, a node or link may fail, or packets may be discarded by a node due to a congestion of its ports. Also, packets may be discarded by a node since they contain bit errors.

Moreover, each packet is transmitted at a transmission time by the source node and is received at a reception time by the destination node. The time elapsing between transmission time and reception time is typically called "one-way delay". The one-way delay of a packet mainly depends on the number of possible intermediate nodes crossed by the packet from source to destination, the permanence time of the packet at each node and the propagation time along the links.

Furthermore, packets may have different one-way delays. The difference between the one-way delays of two packets of a same packet flow is termed "interarrival jitter" (or, briefly, "jitter").

When a communication service (in particular, a real-time voice or data service such as call, conference call, video conference, etc.) is provided by means of a packet-switched network, a performance measurement in terms of packet loss, one-way delay and/or jitter on packet flows carrying the service provides an indication of the quality of service (QoS) perceived by the end users of the service. In addition, packet loss and high delay/jitter may require retransmission and then reduce the efficiency of the communication network. Therefore, measuring packet loss, one-way delay and/or jitter of packet flows in a communication network is of particular interest for network operators.

WO 2010/072251, in the name of the same Applicant, discloses a method for measuring packet loss on a packet flow which uses an alternate marking technique, whereby each packet of the packet flow to be measured comprises a marking bit. Upon transmission of the packet flow, the value of the marking bit applied to the packets is periodically switched every Tm (also termed "marking period") between a first value (e.g. "1") and a second value (e.g. "0"). For each marking period, the transmitting node and the receiving node provide a transmission counter and a reception counter indicating the number of packets transmitted and received during that marking period, respectively. A management server uses the transmission counter and reception counter relating to the same marking period for calculating the packet loss for that marking period.

WO 2011/079857, in the name of the same Applicant, discloses a method for performing time measurements (one-way delay and/or one-way jitter) which uses the alternate marking described above. In particular, for each marking period, the transmitting node and the receiving node provide a transmission timestamp and a reception timestamp indicating the transmission time and the reception time of one or more sample packets transmitted and received during that marking period, respectively. A management server uses the transmission timestamps and reception timestamps relating to the same marking period for calculating e.g. the one-way delay for each sample packet of that marking period.

WO 2013/174417, in the name of the same Applicant, discloses a method for performing average time measurements which uses the alternate marking technique described above. In particular, for each marking period, two measurement points on the path of the packet flow provide respective medium timestamps, each one indicating the medium reception time of the packets received at the measurement point during that marking period. A management server uses the medium timestamps provided by the measurement points and relating to the same marking period for calculating e.g. a one-way medium delay for that marking period.

WO 2015/090364, in the name of the same Applicant, discloses a method for performing time measurements on a packet flow which provides for dividing the packet flow into alternating blocks (by way of example, and not of limitation, using the alternating marking technique described above) and, for each block, marking a number of packets as sample packets to be subjected to individual time measurements. The sampling is applied so that at least a minimum time lapses between consecutive sample packets, which is shorter than a marking period but is long enough to prevent possible reception sequence errors involving consecutive sample packets. Two measurement points on the path of the packet flow provide timestamps for each sample packet. A management server identifies the timestamps relating to sample packets transmitted during a certain marking period and then may calculate e.g. a one-way delay for each sample packet.

As known, QUIC (Quick UDP Internet Connections) is a transport layer (layer 4) network protocol designed to support multiplexed connections between two endpoints over User Datagram Protocol (UDP).

B. Trammel et al.: Internet draft "The addition of a Spin Bit to the QUIC Transport Protocol draft-trammel-quic-spin-01", Dec. 13, 2017 describes the addition of a so-called "latency spin bit" (or, briefly, "spin bit") in the QUIC header, which allows RTT measurements on two counter-propagating packet flows exchanged between two nodes. According to the Internet draft, both nodes (also termed "client" and "server") initially transmit the respective packets with the value of their spin bits set to 0. The client starts an RTT measurement by setting the value of its spin bit to 1. This change of spin bit value may be seen as an edge in the spin bit signal transmitted from client to server. As the server receives such edge, it changes the value of its own spin bit from 0 to 1. This way, the server substantially reflects the edge of the spin bit signal back to the client. As the client receives the reflected edge of the spin bit signal from the server, it switches the value of its spin bit back to 0. This may be seen as another edge in the spin bit signal transmitted from client to server, which is received at the server and reflected back to the client as described above. A rough RTT may then be measured at any intermediate measurement point placed between client and server, as the duration of a spin bit period, namely of the time lapsing between passage in a same direction (e.g. from client to server) of two consecutive edges of the spin bit signal.

SUMMARY OF THE INVENTION

In order to perform a packet loss or a time measurement according to anyone of WO 2010/072251, WO 2011/079857, WO 2013/174417 or WO 2015/090364, the management server shall properly identify counters and/or (average) timestamps relating to each marking period as provided by the nodes or measurement points involved in the performance measurement.

The alternate marking technique advantageously allows the management server to properly identify counters and/or timestamps relating to a same marking period, even if the local clocks of the two or more nodes or measurement points from which the counters and/or timestamps are gathered are not exactly synchronized. In the present description and in the claims, the expression "local clock" will designate a clock signal available at a node of the communication network. The local clock of a node may be either generated by the node itself in an autonomous way (for example by means of a local oscillator located at the node), or may be recovered by the node (for example by means of a clock recovery system) starting from a signal received from a further entity (by way of not limiting example, another network node, the management server, a GPS system, etc.).

In order to prevent the management server from erroneously mixing up counters and/or timestamps relating to different marking periods associated with a same marking value, the local clocks at the nodes or measurement points providing the counters and/or timestamps must be synchronized with a precision not less than 50% Tm (Tm being the marking period), reduced by the maximum propagation delay between the two nodes or measurement points, namely:

$$DC<(Tm/2)-Dmax \qquad [1]$$

where DC is the difference between the local clocks of the nodes or measurement points involved in the performance measurement, Tm is the marking period and Dmax is the maximum propagation delay between the two nodes or measurement points.

In order to simplify the calculation (Dmax is difficult to estimate), a time error ET may be defined as the sum of DC and Dmax. Hence, equation [1] may be rewritten as:

$$ET<Tm/2 \qquad [2]$$

If Tm is set equal to e.g. 5 minutes, Tm/2 is 2.5 minutes, which is far above the typical values of the time error ET in packet switched communication networks. In this case, therefore, the management server has no difficulty to properly identify counters and/or timestamps relating to a same marking period, and accordingly provides correct performance measurements.

In some cases, however, the marking period Tm may be so short that Tm/2 becomes lower than the typical values of the time error ET in packet switched communication networks. This may be the case, for instance, if performance measurements with a very fine granularity are needed, e.g. for the purpose of implementing very fast failure recovery mechanisms. Alternatively, a very short marking period Tm may be the consequence of the fact that the alternate marking is implemented according to the above described spin bit technique provided by QUIC protocol. In this particular case, indeed, the marking period Tm is determined by the RTT (round trip time) between client and server and may be as short as few milliseconds. In these cases, the management server could likely erroneously mix up counters and/or timestamps relating to different marking periods associated with a same marking value, and accordingly provide incorrect performance measurements.

In view of the above, the Applicant has tackled the problem of providing a method for enabling a performance measurement in a packet-switched communication network implementing an alternate marking technique, which allows providing performance measurements with a very fine granularity and which, at the same time, allows proper identification of counters and/or timestamps relating to a same marking period.

In the following description and in the claims, the expression "performing a performance measurement in a packet-switched communication network" will designate an operation of measuring a packet loss and/or a delay and/or a jitter undergone by packets of a packet flow transmitted through the packet-switched communication network.

Further, in the following description and in the claims, the expression "enabling a performance measurement in a packet-switched communication network" will designate an operation of marking and/or conditioning packets transmitted by a node of the packet-switched communication network in such a way that a performance measurement can be made, possibly at intermediate nodes.

According to embodiments of the present invention, the above problem is solved by a method wherein, upon transmission of the packet flow to be measured, a marking value comprised in the packets of the packet flow is periodically switched between at least two alternative marking values with a certain marking period Tm. The flow of marked packets is also divided into blocks having a duration equal to a synchronization period Ts, where the synchronization period Ts contains an integer number of marking periods Tm.

Two or more measurement points may be provided on the path of the flow of marked packets divided in blocks. Each measurement point may provide a plurality of performance parameters, each performance parameter relating to packets transmitted during a respective marking period. Each measurement point may also associate each performance parameter with a respective identification label comprising (i) a locally-generated synchronization information relating to the synchronization period Ts that contains the marking period Tm to which the performance parameter relates and (ii) a sequence information indicating the position of that marking period Tm within the synchronization period Ts. In order to perform the performance measurement, the performance parameters provided by the measurement points and relating to a same marking period Tm are identified based on the synchronization information and the sequence information in the identification labels. Then, the performance measurement may be performed based on the identified performance parameters that relate to the same marking period Tm. It shall be noticed that the measurement points may be implemented and operated by an entity other than the entity managing the marking of the packets. Further, the division into blocks of the marked packets may be managed either by the entity performing the marking or by the entity operating one of the measurement points, or even by a further block-division entity arranged, on the flow of marked packets, between the marking entity and a measurement point.

Advantageously, such method is capable of enabling performance measurements with a very fine granularity and, at the same time, allows proper identification of performance parameters (e.g. counters and/or timestamps) relating to a same marking period.

While indeed the measurement granularity is given by the marking period Tm, the capability of properly identifying performance parameters (e.g. counters and/or timestamps) relating to a same marking period depends on the synchronization period Ts, according to equations similar to equations [1] and [2] above. Hence, the marking period Tm may be chosen short enough to obtain the desired measurement granularity, taking into account the available computational resources (the computational effort in general increases as the marking period Tm decreases). On the other hand, the synchronization period Ts may be chosen long enough to fulfil the conditions set forth in equations [1] and [2] above, taking into account the synchronization properties of the local clocks in the communication network and the typical propagation delays.

According to a first aspect, the present invention provides a method for enabling a performance measurement on a flow of packets transmitted through a packet-switched communication network, the flow of packets comprising a marking value periodically switched between at least two alternative marking values with a marking period, the method comprising:

a) dividing the flow of marked packets into blocks, each block having a duration equal to a synchronization period, the synchronization period comprising an integer number N of marking periods.

Preferably, the marking value is switched upon occurrence of a certain condition, the condition comprising one of:
  detection of a change of marking value in a further flow of packets counter-propagating to the flow of packets, the duration of the marking period being variable; and
  expiry of a timer counting a certain duration of the marking periods.

Preferably, step a) comprises dividing the flow of marked packets into blocks by periodically switching a synchronization value comprised in the packets of flow of packets between at least two alternative synchronization values with the synchronization period.

Step a) may be performed on the packets substantially at the same time as the periodical switching of the marking value or, alternatively, step a) is performed on the packets after the periodical switching of the marking value.

According to a preferred embodiment, at step a) the synchronization period comprises an even integer number N of marking periods.

Preferably, step a) comprises, upon expiration of a synchronization period, checking whether the expiration of the synchronization period coincides with the end of a marking period and, in the negative, waiting for the end of the ongoing marking period before determining that a new synchronization period is to be started.

According to a second aspect, the present invention provides a method for performing a performance measurement on a flow of packets transmitted through a packet-switched communication network, the method comprising the steps of the method as set forth above and:

b) at each one of at least two measurement points provided on the path of the divided flow of marked packets, providing a plurality of performance parameters, each performance parameter relating to packets transmitted during a respective marking period, and associating each performance parameter with a respective identification label comprising:

a synchronization information relating to the synchronization period containing the marking period to which that performance parameter relates, the synchronization information being generated by the measurement point based on its local clock; and
  a sequence information indicating the position of the marking period within the synchronization period.

According to a preferred embodiment, the method further comprises, for each marking period, marking as a sample packet a single packet of said flow of marked packets and, at step b), providing a plurality of performance parameters, each performance parameter relating to packets transmitted during a respective marking period, comprises providing a performance parameter relating to said sample packet.

Preferably, at step b) the synchronization information relating to the synchronization period containing the marking period to which the performance parameter relates comprises one of:
  a start time of the synchronization period as indicated by the local clock of the measurement point;
  a start time of the synchronization period as indicated by the local clock of the measurement point and approximated to the closest integer multiple of the duration of the synchronization period; and
  a counter indicating the position of the synchronization period within the sequence of synchronization periods.

Preferably, at step b) the sequence information comprises a sequence number $n=1, 2, \ldots N$ indicating the position of the marking period within the synchronization period.

Preferably, the method further comprises:

c) identifying performance parameters provided by the at least two measurement points and relating to a same marking period based on the synchronization information and the sequence information; and d) performing the performance measurement based on the identified performance parameters provided by the at least two measurement points and relating to said same marking period.

Preferably, step c) comprises identifying the performance parameters provided by the at least two measurement points and relating to the same marking period as those whose associated identification labels comprise both synchronization information relating to a same synchronization period and sequence information indicative of a same marking period position within the same synchronization period.

According to an embodiment, step c) comprises:
  a first matching step comprising, amongst all the received and stored performance parameters, identifying at least two sets of N performance parameters which relate to the number N of marking periods contained within a same synchronization period, based on the synchronization information comprised in the associated identification labels; and
  a second matching step comprising, amongst the at least two sets of N performance parameters which relate to the number N of marking periods contained within the same synchronization period, identifying at least two performance parameters relating to the same marking period, based on the sequence information comprised in the associated identification labels.

According to a third aspect, the present invention provides a node for a packet-switched communication network, said node being configured to transmit a flow of packets through the packet-switched communication network, the flow of packets comprising a marking value periodically switched between at least two alternative marking values with a marking period, the node being configured to:

divide the flow of marked packets into blocks, each block having a duration equal to a synchronization period, the synchronization period comprising an integer number N of marking periods.

According to a fourth aspect, the present invention provides a measurement point for a packet-switched communication network, the measurement point being arranged on the path of a flow of packets transmitted through said packet-switched communication network, the flow of packets comprising a marking value periodically switched between at least two alternative marking values with a marking period, the flow of marked packets being divided into blocks, each block having a duration equal to a synchronization period, the synchronization period comprising an integer number N of marking periods, the measurement point being configured to:

provide a plurality of performance parameters, each performance parameter relating to packets transmitted during a respective marking period, and associating each performance parameter with a respective identification label comprising:

a synchronization information relating to the synchronization period containing the marking period to which the performance parameter relates, the synchronization information being generated by the measurement point based on its local clock; and a sequence information indicating the position of the marking period within the synchronization period.

According to a fifth aspect, the present invention provides a packet-switched communication network comprising a node as set forth above and at least two measurement points as set forth above.

Preferably, the packet-switched communication network further comprises a management server configured to:

identify performance parameters provided by the at least two measurement points and relating to a same marking period based on the synchronization information and the sequence information; and perform the performance measurement based on the identified performance parameters provided by the at least two measurement points and relating to said same marking period.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
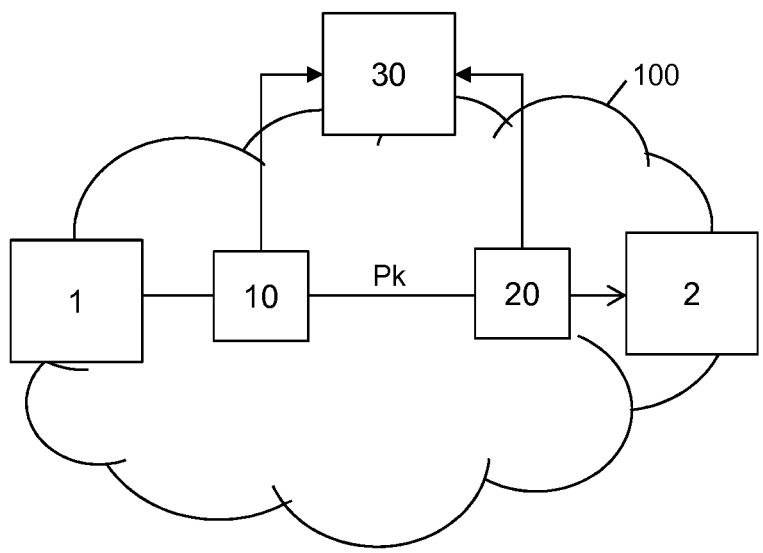
FIG. 1 schematically shows a packet-switched communication network in which the method for enabling performance measurements according to embodiments of the present invention is implemented.

FIG. 1 schematically shows a packet-switched communication network 100 configured to enable performance measurements according to an embodiment of the present invention.

The communication network 100 comprises a plurality of nodes reciprocally interconnected by physical links according to any known topology, including two nodes 1 and 2 shown in FIG. 1. The nodes 1 and 2 may be connected by a single physical link or by the concatenation of several physical links and intermediate nodes (not shown in the drawings). The communication network 100 may be for instance an IP network.

The node 1 is configured to transmit packets Pk to the node 2, as schematically depicted in FIG. 1. The packets Pk may belong to a same packet flow (namely, they may all have a same source address and a same destination address) or to different packet flows whose paths are overlapping between the nodes 1 and 2.

Two or more measurement points 10, 20 are preferably implemented on the path of the packets Pk. Both measurement points 10, 20 may be located at intermediate positions of the path of the packets Pk from the node 1 to the node 2, as schematically depicted in FIG. 1. Alternatively, at least one of the measurement points 10, 20 may be implemented at one of the nodes 1 or 2.

The measurement points 10, 20 preferably cooperate with a management server 30 configured to perform management tasks on the communication network 100, including performance measurements.

The packets Pk are formatted according to a certain network protocol. By way of non limiting example, the network protocol may be the above mentioned QUIC protocol.

Figure 2:
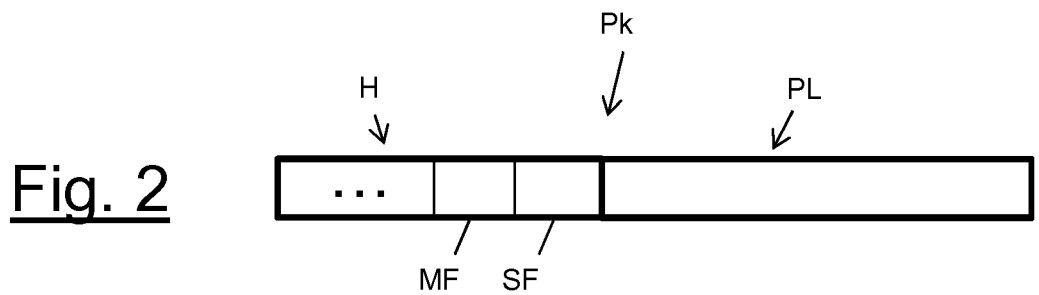
FIG. 2 schematically shows the structure of a packet transmitted through the communication network of FIG. 1, according to embodiments of the present invention.

As schematically depicted in FIG. 2, each packet Pk comprises a payload PL and a header H. The payload PL comprises user data. The header H of each packet Pk is formatted according to the network protocol supported by the network 100 and comprises packet forwarding information (not shown in FIG. 2), namely information allowing the nodes of the network 100 to properly handle the packets Pk so that they reach their destination nodes.

According to embodiments of the present invention, the header H of each packet Pk preferably also comprises a marking field MF and a synchronization field SF.

The marking field MF comprises one or more bits, preferably a single bit. The marking field MF may be set to anyone of two different marking values MA, MB (e.g. "1" and "0", in case of a single bit marking field) in order to implement a first alternate marking on the packet flow PF, as it will be described in detail herein after.

Also the synchronization field SF comprises one or more bits, preferably a single bit. The synchronization field SF may be set to anyone of two different synchronization values SA, SB (e.g. "1" and "0", in case of a single bit synchronization field) in order to implement a second alternate marking on the same packet flow PF, as it will be described in detail herein after.

Though according to the embodiment shown in FIG. 2 the marking field MF and the synchronization field SF are both part of the header H, this is not limiting. For example, if the packet Pk comprises multiple headers corresponding to different network layers, the marking field MF and the synchronization field SF may be comprised in different headers of the packet Pk.

As mentioned above, a first alternate marking is preferably implemented on the packets Pk. Such first alternate marking may be implemented by the node 1.

Figure 3:
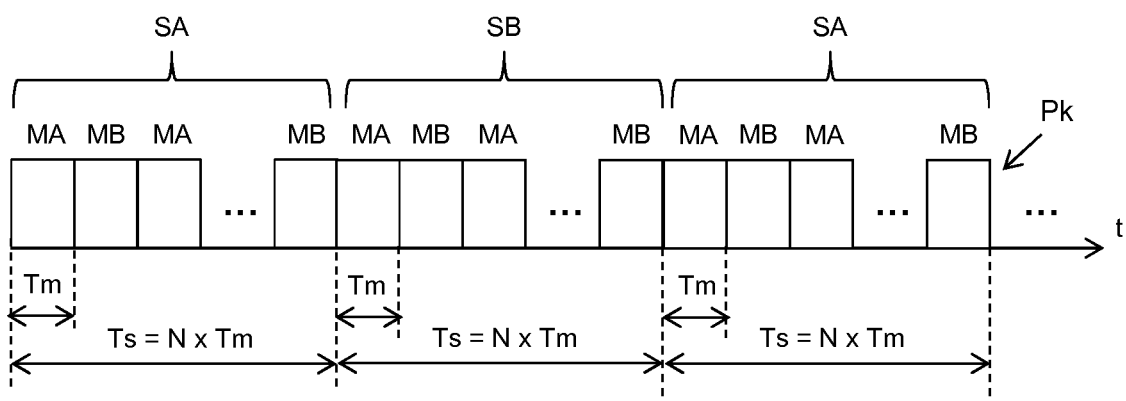
FIG. 3 schematically shows the structure of a packet flow subjected to a first and second marking, according to an embodiment of the present invention.

In particular, the node 1 preferably writes in the marking field MF of each packet Pk to be transmitted a marking value, which is alternately switched between the two marking values MA and MB, as schematically depicted in FIG. 3. The time lapsing between two consecutive switching of the marking value is termed herein after "marking period Tm". Hence, during a marking period Tm, the node 1 transmits to the node 2 packets Pk having their marking field MF set to one of the values MA, MB, e.g. MA. Then, upon expiration of the marking period Tm, the node 1 switches the marking value from MA to MB, so that during the subsequent marking period Tm it will transmit to the node 2 packets Pk having their marking field set to MB. And so on.

The node 1 preferably switches the marking value from MA to MB or vice versa upon occurrence of a certain condition. Such condition may include for instance detection of a change of the marking value in the packets received from the node 2, as it occurs e.g. when the above described spin bit technique of the QUIC protocol is applied. This results in marking periods Tm with variable duration, depending on the round-trip time (RTT) between the nodes 1 and 2. This is however not limiting. For instance, the node 1 may switch the marking value upon expiry of a timer counting a certain predefined duration of the marking period Tm. Such predefined duration may be constant, thereby providing marking periods Tm having all a same duration. Alternatively, the duration of the marking period Tm may be switched between two different values, thereby providing marking periods Tm with a certain duration that alternate in time with marking periods with another duration.

According to embodiments of the present invention, a second alternate marking is also preferably implemented on the packets Pk.

According to an embodiment, the second alternate marking is implemented substantially at the same time as the first alternate marking described above. According to such embodiment, the node 1 may implement both the first and the second alternate marking on the flow of packets Pk.

According to other embodiments, the second alternate marking is implemented after the first alternate marking, namely on the flow of packets Pk already processed according to the first alternate marking as described above. According to such other embodiments, the second alternate marking may be applied by a measurement point, for instance the measurement point 10, or at any intermediate node or point between the node 1 and the measurement point 10.

In case the node 1 implements both the first and the second alternate marking on the flow of packets Pk, the node 1 preferably writes in the synchronization field SF of each packet Pk to be transmitted a synchronization value, which is alternately switched between the two synchronization values SA and SB, as schematically depicted in FIG. 3. The time lapsing between two consecutive switching of the synchronization value is termed herein after "synchronization period Ts". Hence, during a synchronization period Ts, the node 1 transmits to the node 2 packets Pk having their synchronization field SF set to one of the values SA, SB, e.g. SA. Then, upon expiration of the synchronization period, the node 1 switches the synchronization value from SA to SB, so that during the subsequent synchronization period Ts it will transmit to the node 2 packets Pk having their synchronization field set to SB. And so on.

Preferably, the synchronization period Ts has a predefined, fixed duration. The synchronization period Ts is preferably higher than 1 minute, for instance 5 minutes. The synchronization period Ts preferably contains an integer number N of marking periods Tm, namely Ts=N×Tm. More preferably, the synchronization period Ts contains an even integer number N of marking periods Tm. This way, advantageously, all the synchronization periods start with a marking period having the same applicable marking value. This results in a less complex implementation of the method of the invention from the logic and computational point of view. For instance, the marking period Tb may be equal to 1 ms and the synchronization period Ts may be equal to 5 minutes, namely N=300 000. Preferably N is greater than 10. More preferably N is greater than 100, even more preferably greater that 1000.

The operation of the node 1 according to the embodiments wherein it implements both the first and the second alternate marking on the flow of packets Pk will be now described in detail with reference to the flow chart of FIG. 4.

When a performance measurement session shall be started, the node 1 preferably starts a synchronization timer configured to count a synchronization period Ts of a predefined duration, e.g. 5 minutes (step 40).

As the node 1 starts the synchronization timer, it preferably determines the synchronization value SA or SB which it will apply to the packets Pk that it will transmit during that synchronization period Ts (step 41).

For this purpose, the node 1 for instance may store a synchronization table comprising a synchronization period identifier (e.g. a synchronization period start time) and an associated applicable synchronization value. As the node 1 starts the synchronization timer, it preferably reads the current time as indicated by its local clock. The applicable synchronization value as determined at step 41 may be for instance the one that, within the synchronization table, is associated with the synchronization period identifier which is closer to the current time.

Then, while the local timer counting the synchronization period Ts is running (step 42), for each packet Pk to be transmitted the node 1 preferably determines the marking value MA or MB applicable thereto as described above and writes it in its marking field MF (step 43). Since the synchronization period Ts is selected so as to contain an integer number of marking periods Tm, the node 1 will generally switch the applicable marking value between MA and MB several times, before the local timer expires.

Further, the node 1 also preferably writes the applicable synchronization value SA or SB as determined at step 41 in the synchronization field SF of the packets Pk to be transmitted (step 44). The same synchronization value SA or SB will therefore be written by the node 1 in all the packets Pk to be transmitted while the local timer is running.

If both steps 43 and 44 are performed by the node 1, they could be inverted, namely step 44 could be performed before step 43.

Steps 43 and 44 continue being performed until either the synchronization timer counting the synchronization period Ts expires (step 42) or the measurement session ends (step 45).

When the synchronization timer counting the synchronization period Ts expires, the node 1 preferably reverts to step 40, namely it restarts the synchronization timer thereby starting a new synchronization period Ts, and determines the new applicable synchronization value (step 41). Then it continues performing steps 43 and 44 for the whole duration of the new synchronization period Ts.

Figure 4:
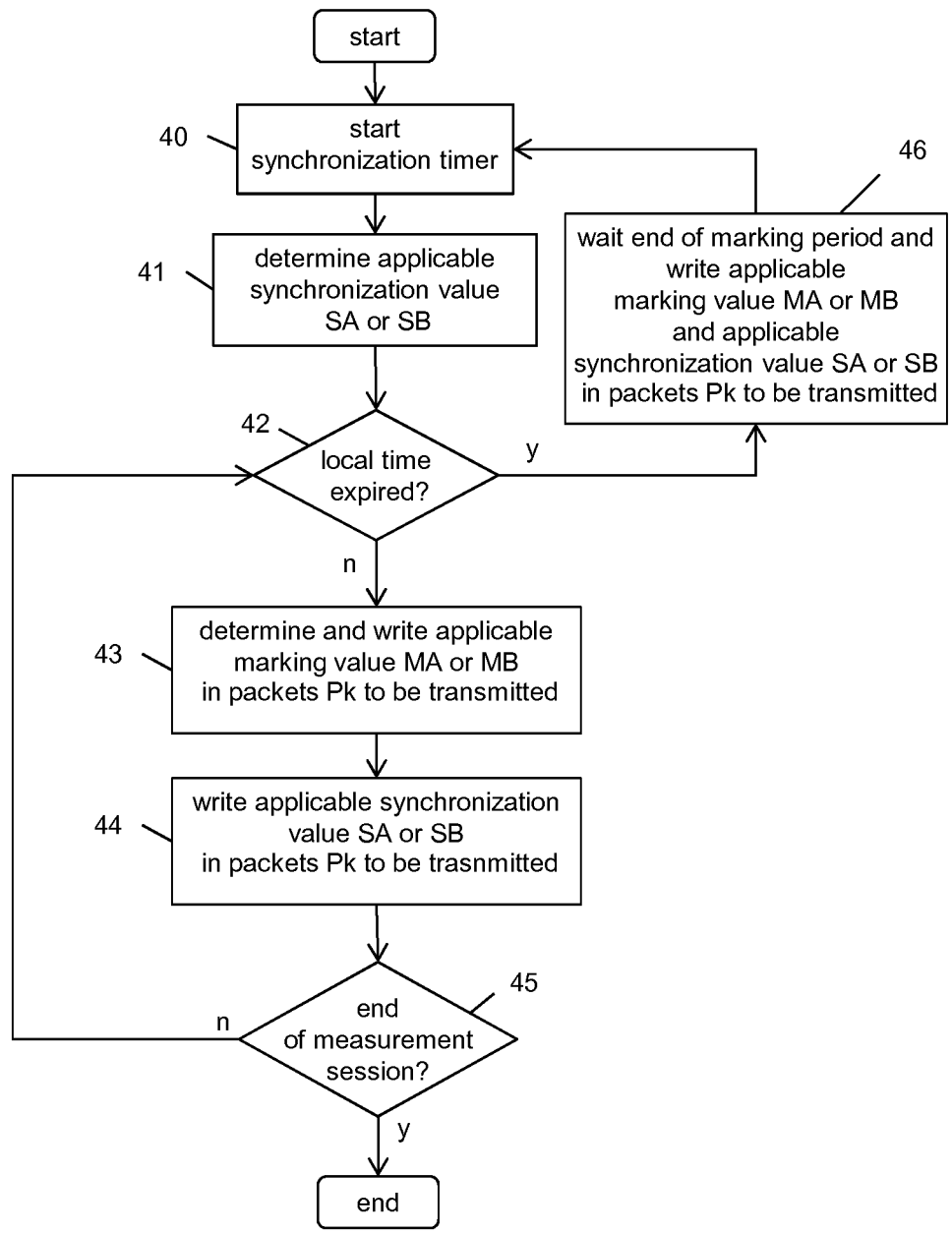
FIG. 4 is a flow chart of the operation of a node of the communication network shown in FIG. 1, according to an embodiment of the present invention.

Optionally, as depicted in FIG. 4, when the synchronization timer counting the synchronization period Ts expires (step 42), the node 1 may check whether the expiration of the synchronization timer (namely, the end of the synchronization period Ts) coincides with the end of a marking period Tm and, in the negative (namely, if a marking period is ongoing) it waits for the end of the ongoing marking period Tm before reverting to step 40 (step 46). While it waits, the node 1 preferably continues performing the first and second marking of the packets Pk to be transmitted (step 43 and 44 described above). In particular, while it waits, the node 1 continues applying the synchronization value as determined at the last iteration of step 41.

The optional execution of step 46 is advantageous when the marking period Tm has a variable duration. As described above, indeed, the synchronization period Ts is chosen so that it contains an integer number N of marking periods Tm. However, as described above, the marking period Tm may have a variable duration, for instance if the first alternate marking of step 43 is performed according to the known spin bit technique of the QUIC protocol. In this case, it can not be guaranteed a priori that every synchronization period Ts comprises exactly an integer number N of marking periods Tm. Step 46 basically provides for adjusting or adapting the duration of every single synchronization period Ts based on the duration of the last marking period contained therein, so as to prevent the latter from being split between two adjacent synchronization periods. In any case, it shall be noticed that, if the synchronization period Ts is selected orders of magnitude higher than the marking period Tm and its typical variations (e.g. 5 minutes vs few milliseconds), step 46 will result in a variability of the actual synchronization period Ts which is orders of magnitude lower than the synchronization period Ts itself. Hence, the synchronization period Ts remains substantially constant even when the marking period Tm is variable and step 46 is executed.

As mentioned above, the second marking may be performed by any of the measurement points 10, 20, for instance the measurement point 10. In this case, the node 1 basically implements exclusively step 43 (first marking), while the other steps of the flow chart of FIG. 4 are performed by the measurement point 10.

Figure 5:
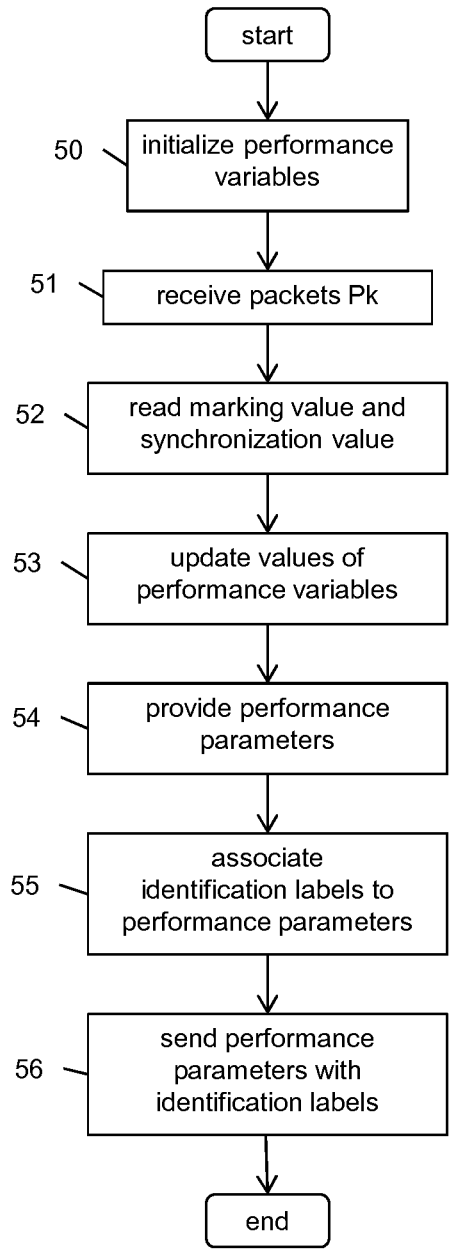
FIG. 5 is a flow chart of the operation of a measurement point of the communication network shown in FIG. 1, according to an embodiment of the present invention.

Each measurement point 10, 20 is preferably configured to provide a plurality of performance parameters relating to the packets Pk containing both a marking value MA, MB and a synchronization value SA, SB, as it will be described herein below with reference to the flow chart of FIG. 5.

As the measurement point 10, 20 has to start a measurement session, it preferably initializes at least one couple of performance variables (step 50). Each couple of performance variables preferably comprises a first performance variable $PV_A^{10}$, $PV_A^{20}$ relating to packets Pk comprising the marking value MA as detected by the measurement point 10, 20 and a second performance variable $PV_B^{10}$, $PV_B^{20}$ relating to packets Pk comprising the marking value MB as detected by the measurement point 10, 20.

The at least one couple of performance variables initialized by each measurement point 10, 20 may comprise for instance:

a first counter variable $C_A^{10}$, $C_A^{20}$ counting the number of packets Pk comprising the marking value MA and a second counter variable $C_B^{10}$, $C_B^{20}$ counting the number of packets Pk comprising the marking value MB; and/or a first timestamp variable $T_A^{10}$, $T_A^{20}$ indicating the reception time of a sample packet Pk comprising the marking value MA and a second timestamp variable $T_B^{10}$, $T_B^{20}$ indicating the reception time of a sample packet Pk comprising the marking value MB.

As the measurement point 10, 20 receives the packets Pk (step 51), it preferably reads the values of their marking field MF and the values of their synchronization field SF (step 52).

Then, based on the values read at step 52, the measurement point 10, 20 preferably updates the values of the first performance variable $PV_A^{10}$, $PV_A^{20}$ and second performance variable $PV_B^{10}$, $PV_B^{20}$ (step 53). By way of non limiting example, at step 53 the measurement point 10, 20 may:

increase by 1 the value of the first counter variable $C_A^{10}$, $C_A^{20}$, upon reception of each packet Pk comprising the marking value MA and increase by one the value of the second counter variable $C_B^{10}$, $C_B^{20}$ upon reception of each packet Pk comprising the marking value MB; and/or set the value of the first timestamp variable $T_A^{10}$, $T_A^{20}$ equal to the reception time (as indicated by a local clock of the measurement point 10, 20) of a sample packet Pk comprising the marking value MA and set the value of the second timestamp variable $T_B^{10}$, $T_B^{20}$ equal to the reception time (as indicated by a local clock of the measurement point 10, 20) of a sample packet Pk comprising the marking value MB.

In the latter case, a packet Pk may be identified as a sample packet by the measurement point 10, 20 in different ways.

For instance, the packets Pk may comprise a suitable field in their header (also termed herein after "sampling field") which is set by the node 1 to a first, non sampling value (e.g. "0") in packets Pk not to be considered as sample packets and to a second, sampling value (e.g. "1") in packets Pk to be considered as sample packets. According to an advantageous variant, the node 1 marks as sample packet a single packet Pk for each marking period Tm, for example the first packet Pk to be transmitted subsequently the beginning of each marking period Tm.

If the marking period Tm is of the order of magnitude of milliseconds (e.g. when the first marking is implemented using the known spin bit technique of the QUIC protocol as described above), marking as sample packet a single packet Pk for each marking period Tm advantageously provides a high number of sample packets. Further, providing a single sample packet Pk for each marking period Tm advantageously minimizes the risk of reception sequence errors involving sample packets comprising the same marking value MA or MB. Further, if a sample packet is lost, this affects the performance measurements of a marking period Tm only, and not of the whole synchronization period Ts.

Alternatively, the measurement points 10, 20 may be configured to identify certain packets Pk as sample packets only based on their positions within the flow of packets Pk. For example, the measurement points 10, 20 may be configured to consider as a sample packet (and hence to properly set the first timestamp variable $T_A^{10}$, $T_A^{20}$ or the second timestamp variable $T_B^{10}$, $T_B^{20}$, as described above) the first packet Pk received during each marking period Tm.

Hence, at marking periods Tm during which the packets Pk comprise the marking value MA, the first performance variable $PV_A^{10}$, $PP_A^{20}$ is running or updated, while the second performance variable $PV_B^{10}$, $PV_B^{20}$ is idle (namely, its value is constant, short of reception sequence errors between packets Pk with different marking values). Conversely, at marking periods Tm during which the packets Pk comprise the marking value MB, the first performance variable $PV_A^{10}$, $PV_A^{20}$ is idle (namely, its value is constant, short of reception sequence errors between packets Pk with different marking values), while the second performance variable $PV_B^{10}$, $PV_B^{20}$ is running or updated.

While updating the values of the first performance variable $PV_A^{10}$, $PV_A^{20}$ and second performance variable $PV_B^{10}$, $PV_B^{20}$ as described above, the measurement point 10, 20 preferably provides a plurality of performance parameters $PP^{10}$, $PP^{20}$, each performance parameter being indicative of the behavior of the packets Pk during a respective marking period Tm (step 54). In particular, herein below $PP^{10}(k, n)$, $PP^{20}(k, n)$ with k=1, 2, 3, ... and n=1, 2, ... N will designate the performance parameter relating to the $n^{th}$ marking period Tm comprised in the $k^{th}$ synchronization period Ts since the beginning of the measurement session.

Preferably, at step 54 the performance parameter $PP^{10}(k, n)$, $PP^{20}(k, n)$ is provided by the measurement point 10, 20 after the end of the $n^{th}$ marking period Tm, as the currently constant value of the performance variable $PV_A^{10}$, $PV_A^{20}$ or $PV_B^{10}$, $PV_B^{20}$ which is currently idle. Hence, the performance parameter $PP^{10}(k, n)$, $PP^{20}(k, n)$ relating to each marking period Tm wherein packets Pk are marked by MA is provided by the measurement point 10, 20 after the end of that marking period Tm, as the currently constant value of the second performance variable $PV_B^{10}$, $PV_B^{20}$, while the performance parameter $PP^{10}(k, n)$, $PP^{20}(k, n)$ relating to each marking period Tm wherein packets Pk are marked by MB is provided by the measurement point 10, 20 after the end of that marking period Tm, as the currently constant value of the first performance variable $PV_A^{10}$, $PV_A^{20}$.

Preferably, the measurement point 10, 20 delays by a certain time gap the provision of the performance parameter $PP^{10}(k, n)$, $PP^{20}(k, n)$ relative to the end of the $n^{th}$ marking period Tm. This guarantees that the considered performance variable is actually idle (namely, it has a currently constant value) when it is used for providing the performance parameter $PP^{10}(k, n)$, $PP^{20}(k, n)$, even in case of reception sequence errors between packets Pk at the boundary between the $n^{th}$ marking period and the $(n+1)^{th}$ marking period. Such time gap is preferably lower than Tm/2.

Hence, by way of non limiting example, at step 54 the measurement point 10, 20 may:
- after the end of each marking period Tm wherein packets are marked by MA, provide a counter $C^{10}(k, n)$, $C^{20}(k, n)$ as the currently constant value of the first counter variable $C_A^{10}$, $C_A^{20}$ and, after the end of each marking period Tm wherein packets are marked by MB, provide a counter $C^{10}(k, n)$, $C^{20}(k, n)$ as the currently constant value of the second counter variable $C_B^{10}$, $C_B^{20}$; and/or
- after the end of each marking period Tm wherein packets are marked by MA, provide a timestamp $T^{10}(k, n)$, $T^{20}(k, n)$ as the currently constant value of the first timestamp variable $T_A^{10}$, $T_A^{20}$ and, after the end of each marking period Tm wherein packets are marked by MB, provide a timestamp $T^{10}(k, n)$, $T^{20}(k, n)$ as the currently constant value of the second timestamp variable $T_B^{10}$, $T_B^{20}$.

According to embodiments of the present invention, the measurement point 10, 20 preferably associates each performance parameter $PP^{10}(k, n)$, $PP^{20}(k, n)$ provided at step 54 with a respective identification label $IL^{10}(k, n)$, $IL^{20}(k, n)$ (step 55). The identification label $IL^{10}(k, n)$, $IL^{20}(k, n)$ associated with each performance parameter $PP^{10}(k, n)$, $PP^{20}(k, n)$ preferably comprises:

- a synchronization information relating to the $k^{th}$ synchronization period Ts; and
- a sequence information indicative of the position the $n^{th}$ marking period Tm within the $k^{th}$ synchronization period Ts.

Preferably, the synchronization information relating to the $k^{th}$ synchronization period Ts is generated by the measurement point 10, 20 based on (i) the synchronization values SA, SB comprised in the received packets Pk and (ii) a local clock of the measurement point 10, 20.

For example, the synchronization information relating to the $k^{th}$ synchronization period Ts may comprise the start time $t_{start}(k)$ of the $k_{th}$ synchronization period Ts as indicated by the local clock of the measurement point 10, 20. The measurement point 10, 20 preferably determines that a new synchronization period Ts is starting as it detects a change of the synchronization value comprised in the received packets Pk (e.g. from SA to SB or vice versa). Upon detection of the beginning of a new synchronization period Ts, the measurement point 10, 20 preferably reads the current time as indicated by its local clock, thereby obtaining the start time $t_{start}(k)$ of the new synchronization period Ts.

Optionally, at step 55 the measurement point 10, 20 may approximate the start time $t_{start}(k)$ of the $k^{th}$ synchronization period Ts as indicated by its own local clock to the closest integer multiple of Ts, $t'_{start}(k)$, and use such approximated value as synchronization information within the identification label $IL^{10}(k, n)$, $IL^{20}(k, n)$. For example, if the synchronization period Ts is 5 minutes and the start times of the $k^{th}$ synchronization period Ts as indicated by the local clock of the measurement point 10, 20 is $t_{start}(k)$=31:50, the measurement point 10, 20 may approximate it to the closest integer multiple of 5 minutes, namely $t'_{start}(k)$=30:00.

According to other variants, the synchronization information relating to the $k^{th}$ synchronization period Ts may comprise the value of a counter C(k) indicating the position of the $k^{th}$ synchronization period Ts within the sequence of the synchronization periods.

Preferably, the value of the counter C(k) is in any case derived from the current time as indicated by the local clock of the measurement point 10, 20.

As to the sequence information, it preferably comprises a sequence number n=1, 2, ... N indicating the position of the marking period Tm within the synchronization period Ts. The measurement point 10, 20 may provide the correct value of n for example by implementing a variable which is reset to 0 at the beginning of each synchronization period Ts determined as described above and is increased by 1 each time the measurement point 10, 20 determines the beginning of a new marking period Tm as a change of the marking value (e.g. from MA to MB or vice versa) comprised in the received packets Pk. The current value of such variable after the end of each marking period Tm may be used as the sequence information to be associated with the performance parameter $PP^{10}(k, n)$, $PP^{20}(k, n)$ relating to that marking period Tm.

Hence, the identification label $IL^{10}(k, n)$, $IL^{20}(k, n)$ associated with the performance parameter $PP^{10}(k, n)$, $PP^{20}(k, n)$ relating to the $n^{th}$ marking period Tm of the $k^{th}$ synchronization period Ts since the beginning of the performance measurement for example may be $(t_{start}(k); n)$ or $(t'_{start}(k); n)$.

Then, the measurement point 10, 20 preferably sends to the management server 30 the plurality of performance parameters $PP^{10}(k, n)$, $PP^{20}(k, n)$ as provided at step 54 with the associated identification labels $IL^{10}(k, n)$, $IL^{20}(k, n)$ as provided at step 55 (step 56).

At step 56, the measurement point 10, 20 may send to the management server 30 each single performance parameter $PP^{10}(k, n)$, $PP^{20}(k, n)$ with its identification label $IL^{10}(k, n)$, $IL^{20}(k, n)$ as soon as they have been generated at steps 54 and 55. Hence, the measurement point 10, 20 sends to the management server 30 a performance parameter every marking period Tm.

Alternatively, the measurement point 10, 20 may simultaneously send to the management server 30 a plurality of performance parameters $PP^{10}(k, n)$, $PP^{20}(k, n)$ (with the respective identification labels) relating to a corresponding plurality of consecutive marking periods Tm. For example, at the end of each synchronization period Ts, the measurement point 10, 20 may simultaneously send to the management server 30 the N performance parameters $PP^{10}(k, n)$, $PP^{20}(k, n)$ (n=1, 2, ... N) relating to the N marking periods Tm contained within the last synchronization period Ts.

The management server 30 then receives a plurality of performance parameters $PP^{10}(k, n)$ with the respective identification labels $IL^{10}(k, n)$ from the measurement point 10 and a plurality of performance parameters $PP^{20}(k, n)$ with the respective identification labels $IL^{20}(k, n)$ from the measurement point 20 and perform performance measurements based on them.

Figure 6:
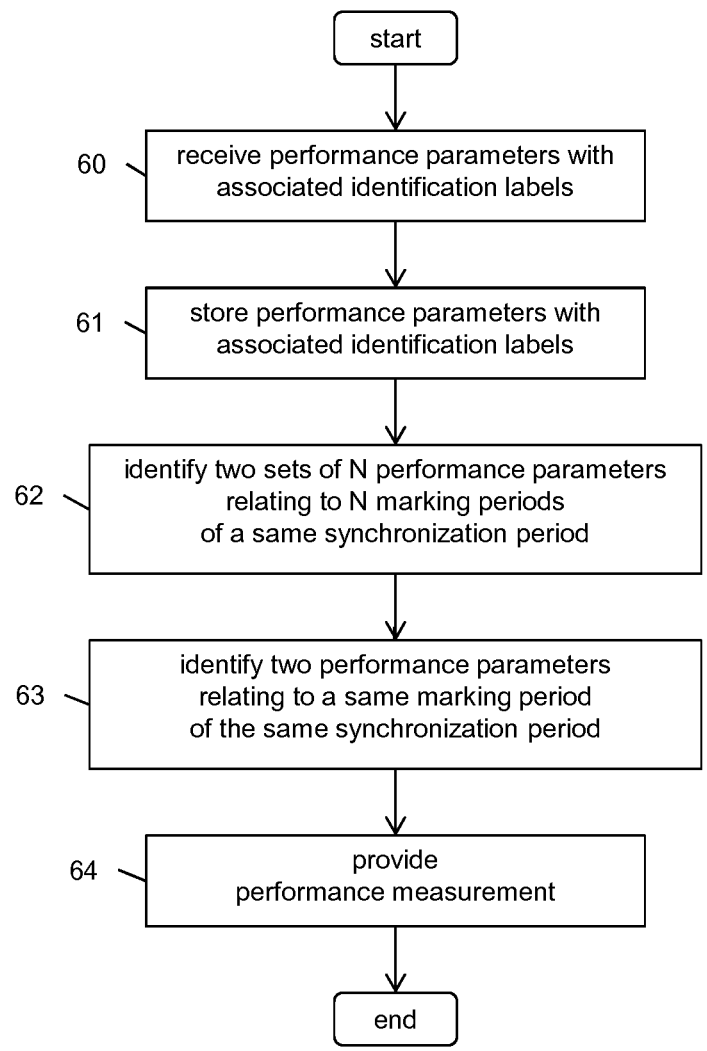
FIG. 6 is a flow chart of the operation of the management server of the communication network shown in FIG. 1, according to an embodiment of the present invention.

In particular, with reference to the flow chart of FIG. 6, as the management server 30 starts receiving the performance parameters $PP^{10}(k, n)$ and $PP^{20}(k, n)$ with the respective identification labels $IL^{10}(k, n)$ and $IL^{20}(k, n)$ from the measurements points 10 and 20 (step 60), respectively, it preferably stores them locally (step 61).

Then, the management server 30 preferably matches each performance parameter $PP^{10}(k, n)$ received from the measurement point 10 with a respective performance parameter $PP^{20}(k, n)$ received from the measurement point 20 and relating to the same marking period Tm, based on the content of their identification labels $IL^{10}(k, n)$ and $IL^{20}(k, n)$.

In particular, the management server 30 preferably identifies as performance parameters relating to a same marking period Tm those whose associated identification labels comprise both synchronization information relating to the same synchronization period Ts and sequence information indicative of the same marking period position within the synchronization period Ts.

Such matching operation preferably is a two-step operation.

During a first matching step 62, the management server 30 preferably identifies, amongst all the received and stored performance parameters, the two sets of N performance parameters $PP^{10}(k, n)$ and $PP^{20}(k, n)$ (n=1, 2, ... N) which relate to the N marking periods Tm contained within a same synchronization period Ts, based on the synchronization information comprised in the associated identification labels $IL^{10}(k, n)$ and $IL^{20}(k, n)$.

Since, as described above, each measurement point 10, 20 generates the synchronization information based on its own local clock, the synchronization information comprised in the identification labels $IL^{10}(k, n)$ and $IL^{20}(k, n)$ associated with performance parameters $PP^{10}(k, n)$ and $PP^{20}(k, n)$ relating to a same synchronization period Ts may have different values. For instance, if the synchronization information relating to the $k^{th}$ synchronization period Ts comprises its start time $t_{start}(k)$ determined as described above, the start time as determined by the measurement point 10 may be different from the start time as determined by the measurement point 20, due to both the propagation delay of packets Pk between the measurement point 10 and the measurement point 20 and the difference between their local clocks.

It may be however appreciated that, consistently with the above equations [1] and [2], the management server 30 is capable of unambiguously recognizing the start times determined by the measurement points 10 and 20 for a same synchronization period if:

$$DC<(Ts/2)-Dmax \quad [3]$$

where DC is the difference between the local clocks of the measurement points 10, 20 and Dmax is the maximum propagation delay between the measurement points 10, 20 or, equivalently, if:

$$ET<Ts/2 \quad [4]$$

where ET is the time error defined as the sum of DC and Dmax.

If the synchronization period Ts is set equal to e.g. 5 minutes, Ts/2 is 2.5 minutes, which is far above the typical values of the time error ET in packet switched communication networks. Hence, at step 62 the management server 30 has no difficulty to properly identify, amongst all the performance parameters $PP^{10}(k, n)$ and $PP^{20}(k, n)$ received from the measurements points 10 and 20, those that relate to the N marking periods Tm contained within a same synchronization period Ts, based on the synchronization information comprised in the identification labels $IL^{10}(k, n)$ and $IL^{20}(k, n)$ associated thereto.

Then, during a second matching step 63, amongst all the performance parameters $PP^{10}(k, n)$ and $PP^{20}(k, n)$ received from the measurements points 10 and 20 and relating to the N marking periods Tm contained within the synchronization period Ts identified at step 62, the management server 30 preferably identifies the two performance parameters $PP^{10}(k, n)$ and $PP^{20}(k, n)$ relating to the same marking period Tm, based on the sequence information comprised in the associated identification labels $IL^{10}(k, n)$ and $IL^{20}(k, n)$.

In particular, at step 63 the management server 30 preferably identifies the two performance parameters $PP^{10}(k, n)$ and $PP^{20}(k, n)$ relating to the same marking period Tm as those whose associated identification labels $IL^{10}(k, n)$ and $IL^{20}(k, n)$ comprise the same sequence information, e.g. the same sequence number.

Then, the management server 30 preferably provides a performance measurement for each marking period Tm, using the two performance parameters $PP^{10}(k, n)$ and $PP^{20}(k, n)$ relating to the same marking period Tm as identified at step 63 (step 64).

By way of non limiting example, at step 64 the management server 30 may calculate, for each marking period Tm:

a packet loss PL(k,n) as a difference between the counter $C^{10}(k, n)$ provided by the measurement point 10 and the counter $C^{20}(k, n)$ provided by the measurement point 20; and/or a one-way delay OWD(k,n) as a difference between the timestamp $T^{20}(k, n)$ provided by the measurement point 20 and the timestamp $T^{10}(k, n)$ provided by the measurement point 10.

Other types of measurements are possible, such as average time measurements and/or jitter measurements.

It may be appreciated that the granularity of the performance measurements provided at step 64 is equal to the marking period Tm. Hence, if the marking period Tm is very short (e.g. few milliseconds), either because the first marking is implemented based on the spin bit technique of the QUIC protocol, or because a very low value of Tm is expressly chosen for the purpose of e.g. implementing very fast failure recovery mechanisms, a performance measurement with a very fine granularity is advantageously provided.

Despite such fine measurement granularity, as described above the management server 30 is nonetheless capable of properly identifying the performance parameters that relate to the same marking period Tm. This is due to the fact that identification of the performance parameters relating to the same, specific marking period Tm is a two-step process whose first step provides for identification of all the performance parameters relating to a same synchronization period Ts. By selecting Ts so that the conditions set forth in the above equations [3] and [4] are fulfilled, the management server 30 may properly identify all the performance parameters relating to a same synchronization period Ts, based on synchronization information generated by the measurement points based on their local clocks.

According to an advantageous variant of the present invention, performance measurements with different granularities Tm and Ts may also be made. For example, while the one-way delay may be measured with a finer granularity equal to the marking period Tm as described above, the packet loss may be measured with a coarser granularity equal to the synchronization period Ts. This may be implemented by updating the values of the first counter variables $C_A^{10}$, $C_A^{20}$ and the second counter variables $C_B^{10}$, $C_B^{20}$ based on the synchronization values SA, SB, instead of the marking values MA, MB, so that the first counter variables $C_A^{10}$, $C_A^{20}$ count the number of packets Pk comprising the synchronization value SA, while the second counter variables $C_B^{10}$, $C_B^{20}$ count the number of packets Pk comprising the synchronization value SB. According to such embodiment, each measurement point 10, 20 preferably provides a single performance parameter, namely a counter, for each synchronization period Ts. Each measurement point associates to each counter an identification label comprising only the locally-generated synchronization information relating to the synchronization period Ts to which the counter relates, e.g. the start time of the synchronization period Ts as indicated by its local clock. The management server will identify counters provided by different measurement points and relating to the same synchronization period Ts based exclusively on the synchronization information comprised in the identification labels associated with the counters received from the measurement points.

Though in the above description reference has been made to a management server 30 cooperating with the measurement points 10, 20 and in charge of performing the operations of the flow chart of FIG. 6, this is not limiting. According to other embodiments not shown in the drawings, the operations of the flow chart of FIG. 6 may be carried out by any one of the measurement points 10, 20. In that case, the other measurement point preferably sends its performance parameters and associated identification labels to the measurement point in charge of performing the operations of the flow chart of FIG. 6.

Further, though according to the above description the packets Pk are subjected to a first and second marking only, according to other embodiments the packets Pk may be subjected to further marking with a further period Ts' higher than the synchronization period Ts. In this case, only the longer period Ts' is identified based on synchronization information, while both Ts and Tm are identified based on sequence information.

Further, though according to the above description the division of the flow of marked packets Pk in blocks having duration Ts is implemented by a second marking nested with the first marking, this is also not limiting. According to other variants, such division may be implemented in other ways, e.g. by using special packets to delimit the boundary between two consecutive blocks.

Further, though according to the above description both the first marking and the second marking provide for two alternative marking values only (SA/SB and MA/MB), this is not limiting. According to other variants of the present invention, the first marking and/or the second marking may provide for N alternative marking values that are cyclically applied, with N higher than 2.

The invention claimed is:

1. A method for enabling a performance measurement on a flow of packets transmitted through a packet-switched communication network, the flow of packets comprising a marking value periodically switched between at least two alternative marking values with a marking period, the method comprising:
   a) dividing the flow of marked packets into blocks, each block having a duration equal to a synchronization period, the synchronization period comprising an integer number N of the marking periods, and the integer number N being greater than 1, including:
      periodically switching a synchronization value comprised in the packets of the packet flow between at least two alternative synchronization values with the synchronization period, the synchronization value being distinct from the marking value,
   wherein the marking value periodically switches between the at least two alternative marking values in the marking periods within the synchronization period.

2. The method according to claim 1, wherein the marking value is switched upon occurrence of a certain condition, the condition comprising one of:
   detection of a change of a marking value in a further flow of packets counter-propagating to the flow of packets, the duration of the marking period being variable; and
   expiry of a timer counting a certain duration of the marking periods.

3. The method according to claim 1, wherein the synchronization value periodically switches between the at least two alternative synchronization values across at least two of the synchronization periods.

4. The method according to claim 1, wherein:
   step a) is performed on the packets substantially at the same time as the periodically switching the marking value; or
   step a) is performed on the packets after the periodically switching the marking value.

5. The method according to claim 1, wherein at step a) the synchronization period comprises an even integer number N of marking periods.

6. The method according to claim 1, wherein step a) comprises, upon expiration of a synchronization period, checking whether the expiration of the synchronization period coincides with an end of a marking period and, in the negative, waiting for the end of the ongoing marking period before determining that a new synchronization period is to be started.

7. A method for performing a performance measurement on a flow of packets transmitted through a packet-switched communication network, the method comprising:
   the steps of the method according to claim 1; and
   b) at each one of at least two measurement points provided on a path of the divided flow of marked packets, providing a plurality of performance parameters, each performance parameter relating to packets transmitted during a respective marking period, and associating each performance parameter with a respective identification label comprising:

synchronization information relating to a synchronization period containing a marking period to which the performance parameter relates, the synchronization information being generated by the measurement point based on its local clock; and sequence information indicating a position of the marking period within the synchronization period.

8. The method according to claim 7, wherein at step b) the synchronization information relating to the synchronization period containing the marking period to which the performance parameter relates comprises one of:

a start time of the synchronization period as indicated by the local clock of the measurement point;

a start time of the synchronization period as indicated by the local clock of the measurement point and approximated to a closest integer multiple of a duration of the synchronization period; and a counter indicating a position of the synchronization period within a sequence of synchronization periods.

9. The method according to claim 7, wherein at step b) the sequence information comprises a sequence number n=1, 2, . . . N indicating a position of the marking period within the synchronization period.

10. The method according to claim 7, further comprising, for each marking period, marking as a sample packet a single packet of the flow of marked packets, wherein at step b) the providing the plurality of the performance parameters, each performance parameter relating to the packets transmitted during the respective marking period, comprises providing a performance parameter relating to the sample packet.

11. The method according to claim 7, further comprising:

c) identifying performance parameters provided by the at least two measurement points and relating to a same marking period based on the synchronization information and the sequence information; and d) performing the performance measurement based on the identified performance parameters provided by the at least two measurement points and relating to the same marking period.

12. The method according to claim 11, wherein step c) comprises identifying the performance parameters provided by the at least two measurement points and relating to the same marking period as those whose associated identification labels comprise both synchronization information relating to a same synchronization period and sequence information indicative of a same marking period position within the same synchronization period.

13. The method according to claim 12, wherein step c) comprises:

a first matching step comprising, amongst all received and stored performance parameters, identifying at least two sets of N performance parameters which relate to the number N of marking periods contained within a same synchronization period based on the synchronization information comprised in the associated identification labels; and a second matching step comprising, amongst the at least two sets of N performance parameters which relate to the number N of marking periods contained within the same synchronization period, identifying at least two performance parameters relating to the same marking period based on the sequence information comprised in the associated identification labels.

14. A node for a packet-switched communication network, the node being configured to transmit a flow of packets through the packet-switched communication network, the flow of packets comprising a marking value periodically switched between at least two alternative marking values with a marking period, the node comprising a processor configured to:

divide the flow of marked packets into blocks, each block having a duration equal to a synchronization periods, the synchronization period comprising an integer number N of the marking periods, and the integer number N being greater than 1, including:

periodically switching a synchronization value comprised in the packets of the packet flow between at least two alternative synchronization values with the synchronization period, the synchronization value being distinct from the marking value, wherein the marking value periodically switches between the at least two alternative marking values in the marking periods within the synchronization period.

15. A measurement point for a packet-switched communication network, the measurement point being arranged on a path of a flow of packets transmitted through the packet-switched communication network, the flow of packets comprising a marking value periodically switched between at least two alternative marking values with a marking period, the flow of marked packets being divided into blocks, each block having a duration equal to a synchronization period, the synchronization period comprising an integer number N of the marking periods, the integer number N being greater than 1 including periodically switching a synchronization value comprised in the packets of the packet flow between at least two alternative synchronization values with the synchronization period, the synchronization value being distinct from the marking value, and the marking value being periodically switched between the at least two alternative marking values in the marking periods within the synchronization period, and the measurement point comprising a processor configured to:

provide a plurality of performance parameters, each performance parameter relating to packets transmitted during a respective marking period, and associating each performance parameter with a respective identification label comprising:

synchronization information relating to a synchronization period containing a marking period to which the performance parameter relates, the synchronization information being generated by the measurement point based on its local clock; and sequence information indicating the position of the marking period within the synchronization period.

16. A packet-switched communication network comprising:

the node according to claim 14; and a measurement point, the measurement point being arranged on a path of the flow of packets transmitted through the packet-switched communication network, the measurement point being configured to:

provide a plurality of performance parameters, each performance parameter relating to packets transmitted during a respective marking period, and associating each performance parameter with a respective identification label comprising:

synchronization information relating to a synchronization period containing a marking period to which the performance parameter relates, the synchronization information being generated by the measurement point based on its local clock; and sequence information indicating the position of the marking period within the synchronization period.

17. The packet-switched communication network according to claim 16, further comprising a management server configured to:

identify performance parameters provided by at least two of the measurement points and relating to a same marking period based on the synchronization information and the sequence information; and perform a performance measurement based on the identified performance parameters provided by the at least two measurement points and relating to the same marking period.

18. The method according to claim 1, wherein the synchronization value is the same for the marked packets in the synchronization period.

* * * * *